United States Patent [19]

Haennelt et al.

[11] Patent Number: 5,092,688
[45] Date of Patent: Mar. 3, 1992

[54] PORTABLE BARCODE PRINTER

[75] Inventors: Dennis R. Haennelt, Pismo Beach; John F. Bergquist, Atascadero, both of Calif.

[73] Assignee: Cognitive Solutions, Inc., Carmelita-Atascadero, Calif.

[21] Appl. No.: 575,823

[22] Filed: Aug. 31, 1990

[51] Int. Cl.$^5$ .............................................. B41J 3/20
[52] U.S. Cl. .................................... 400/120; 400/613; 400/88; 346/76 PH
[58] Field of Search ............ 400/120, 613, 614, 608.2, 400/619, 614.1, 594, 88; 346/76 PH

[56] References Cited

U.S. PATENT DOCUMENTS

| | | | |
|---|---|---|---|
| 4,243,333 | 1/1981 | Bradshaw et al. | 400/613 |
| 4,549,825 | 10/1985 | Fish, III et al. | 400/120 HE |
| 4,563,690 | 1/1986 | Tomita et al. | 400/608.2 |
| 4,586,834 | 5/1986 | Hachisuga et al. | 400/613 |
| 4,634,304 | 1/1987 | Narushima et al. | 400/613.2 |
| 4,771,296 | 9/1988 | Shimada et al. | 400/120 |
| 4,881,831 | 11/1989 | Tauita et al. | 400/619 |
| 4,884,904 | 12/1989 | Berquist | 400/120 |
| 4,962,392 | 10/1990 | Okuno et al. | 400/120 HE |

FOREIGN PATENT DOCUMENTS

| | | | |
|---|---|---|---|
| 0120455 | 10/1984 | European Pat. Off. | 400/120 HE |
| 0213184 | 9/1986 | Japan | 400/120 HE |
| 0266261 | 11/1986 | Japan | 400/120 HE |

OTHER PUBLICATIONS

"Thermal Print Head Control" IBM Tech. Discl. Bulletin, vol. 21, No. 4, 9/78, pp. 1594-1595.
"Paper Feed" IBM Tech. Discl. Bulletin, vol. 22, No. 5, 10/79, pp. 1746-1748.
"Paper Feed and Index Mechanism" IBM Technical Disclosure Bulletin, vol. 29, No. 7, 12/86, pp. 2865-2866.

Primary Examiner—Eugene H. Eickholt
Attorney, Agent, or Firm—Fleit, Jacobson, Cohn, Price, Holman & Stern

[57] ABSTRACT

A barcode printer is provided constructed out of rectangular, extruded aluminum stock. The mechanical components are mounted directly to the stock frame of a main housing section which eliminates the need for a separate internal mechanism housing and an external cosmetic housing. The motor is mounted approximately in the center of the unit and along with a plastic enclosure assembly, acts as a spindle for a roll of printing media. This orientation of the motor maximizes its utility and contributes to the compactness of the unit. A full roll of printing media is loaded into the unit by removing a cap which covers the side of the roll of paper and provides see-through availability for determining the amount of stock remaining. The printhead is lifted off the platen (drive) roller and the paper will then slide on and off the spindle. The printhead lifting mechanism includes a printhead dial rotatably mounted on the frame and secured with a retaining ring. A spring anchor is mounted to the dial and protrudes into the housing. Another spring anchor is mounted to the printhead which is also rotatably mounted to the frame. An extension spring is connected to both anchors and in the closed position provides the required pressure (bias) for imaging. When the dial is rotated counterclockwise, the load is removed from the spring and the spring then acts as a push rod to move the printhead into an open position.

17 Claims, 6 Drawing Sheets

PORTABLE BARCODE PRINTER

FIELD OF THE INVENTION

This invention relates to barcode printers for barcode labeling and tagging.

BACKGROUND OF THE INVENTION

Some barcode printers use thermal graphic paper which turns black when heated to a high temperature. The ability to use this paper allows great flexibility in formatting and produces semi-permanent, easy to read barcode labels. A printhead produces a high quality label through a series of heating elements that create an image on the thermal paper.

SUMMARY OF THE INVENTION

By the present invention, a portable barcode printer is designed for printing barcodes on-site, at the point of application. A lightweight metal alloy shell and shock-resistant components make the portable barcode printer suited for rigorous use. The printer includes a 12-volt battery with power to print over 2,000 labels on a single charge.

The paper path is 1.5 inches wide, while the printhead is 1.26 inches wide. The printer is capable of printing a label up to eight inches in length in a 100 dots per inch mode. The printing speed is 1.5 inches per second.

The portable barcode printer is charged by a wall mounted transformer. A round connector on a transformer is plugged into the printer in a corresponding jack.

In loading paper into the portable barcode printer using direct thermal paper, a central paper cylinder is removed by pulling it off of a motor spindle located centrally in a paper storage container. A three-position printhead control knob is shifted counterclockwise to a terminal position to pivot the printhead to an open position. A new roll of thermal paper is placed over the motor spindle and paper is fed through a feed slot until passing over a drive roller.

The printhead control knob is then shifted clockwise to a central position to turn the printhead to a closed position. Further clockwise movement of the printhead control knob to its opposite terminal position locks the printhead in its operative printing position. A paper feed switch is then depressed to activate the drive roller to advance the paper located between the drive roller and the printhead.

Labels are printed by the barcode printer based on commands received from a barcode command module and connected to the printer. The labels made on the barcode printer are created using a grid of dots. The labels are created by passing thermally reactive paper past a horizontal (parallel to the perforations in the paper) row of "hot spots" on the printhead. The hot spots are turned on and off as the paper passes by, in order to create a dot on a label. The vertical lengths of the dots are controlled by commanding the printer to keep the hot spot "on" as the paper passes underneath for a certain length of time. This is called the dot time (also called the aspect ratio).

The portable barcode printer is interfaced with virtually any scanner or hand-held computer through its RS232 port. All popular barcodes symbiologies are built in. ASCII software with a 200 dot per inch printhead gives the user maximum control in designing and printing labels.

The portable barcode printer of the present invention is constructed out of and housed within a two inch by four inch rectangular, extruded aluminum stock. The use of this material has made it possible to be in production without any up front tooling, is readily available and is inexpensive. The mechanical components are mounted directly to the stock frame of a main housing section which eliminates the need for a separate internal mechanism housing and an external cosmetic housing. The extruded aluminum stock serves both functions.

The motor is mounted approximately in the center of the unit and along with a plastic enclosure assembly, acts as a spindle for a roll of printing media. This orientation of the motor maximizes its utility and contributes to the compactness of the unit.

A full roll of printing media is loaded into the unit by removing a cap which covers the side of the roll of paper and provides see-through availability for determining the amount of stock remaining. The printhead is lifted off the platen (drive) roller and the paper will then slide on and off the spindle which includes a drive motor. A leader is pulled off from a new roll of paper to be added and inserted in a slot defined in the side of the housing while loading the roll so that when the printhead is closed the printer is ready to print.

The printhead lifting mechanism includes a printhead dial rotatably mounted on the frame and secured with a retaining ring. A spring anchor is mounted to the dial and protrudes into the housing through an arcuate groove. Another spring anchor is mounted to the printhead which is also rotatably mounted to the housing. An extension spring is connected to both anchors and in the closed position provides the required pressure (bias) for imaging. When the dial is rotated counterclockwise, the load is removed from the spring and the spring then acts as a push rod to move the printhead into an open position.

It is an object of the present invention to provide a portable barcode printer having a housing made of rectangular extruded aluminum.

It is another object of the present invention to provide a portable barcode printer having a housing made of rectangular extruded aluminum with a paper supply spindle housing a drive motor.

It is yet another object of the present invention to provide a portable barcode printer having a housing made of rectangular extruded aluminum with a paper supply spindle housing a drive motor and having a printhead lifting mechanism to move a printhead assembly between an open, a closed and a print position.

These and other objects of the invention, as well as many of the intended advantages thereof, will become more readily apparent when reference is made to the following description taken in conjunction with the accompanying drawings.

DETAILED DESCRIPTION OF THE DRAWINGS

Figure 1:
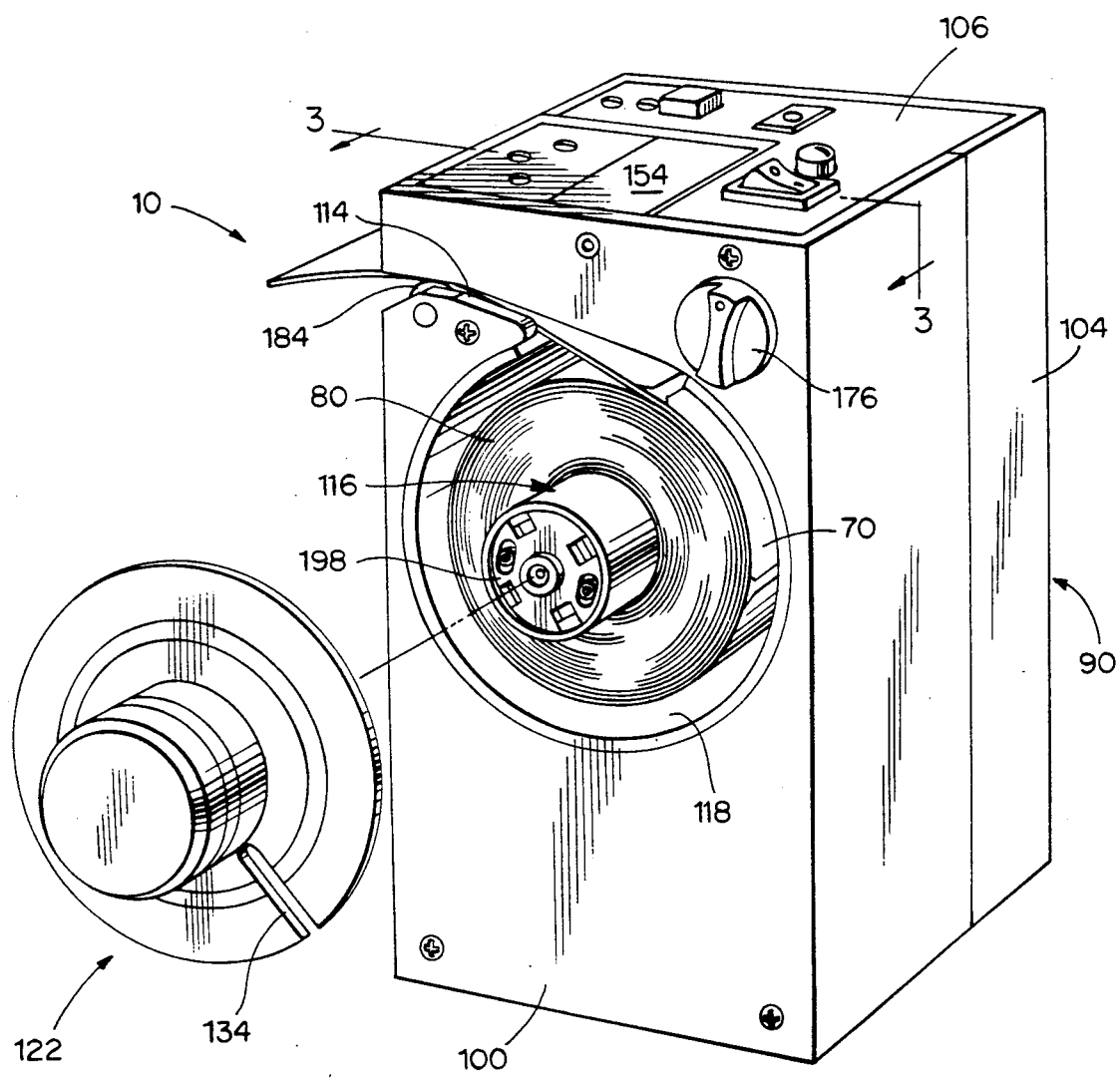
FIG. 1 is a perspective view of a portable barcode printer.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
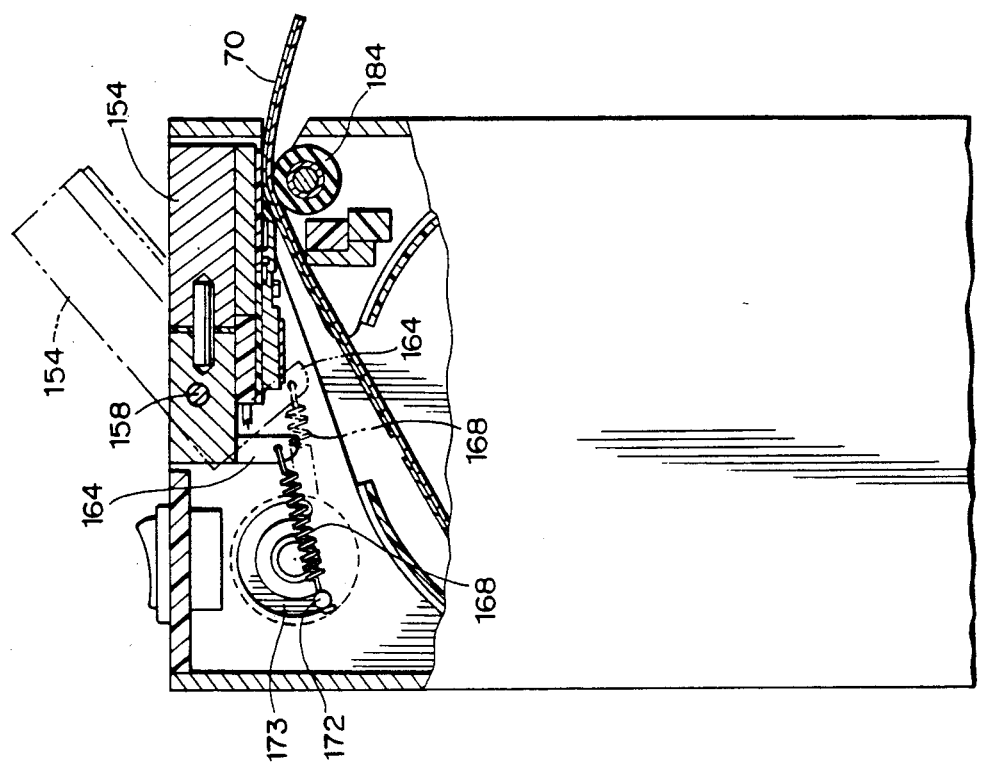
FIG. 3 is a sectional view taken along line 3—3 of FIG. 1.
Figure 2:
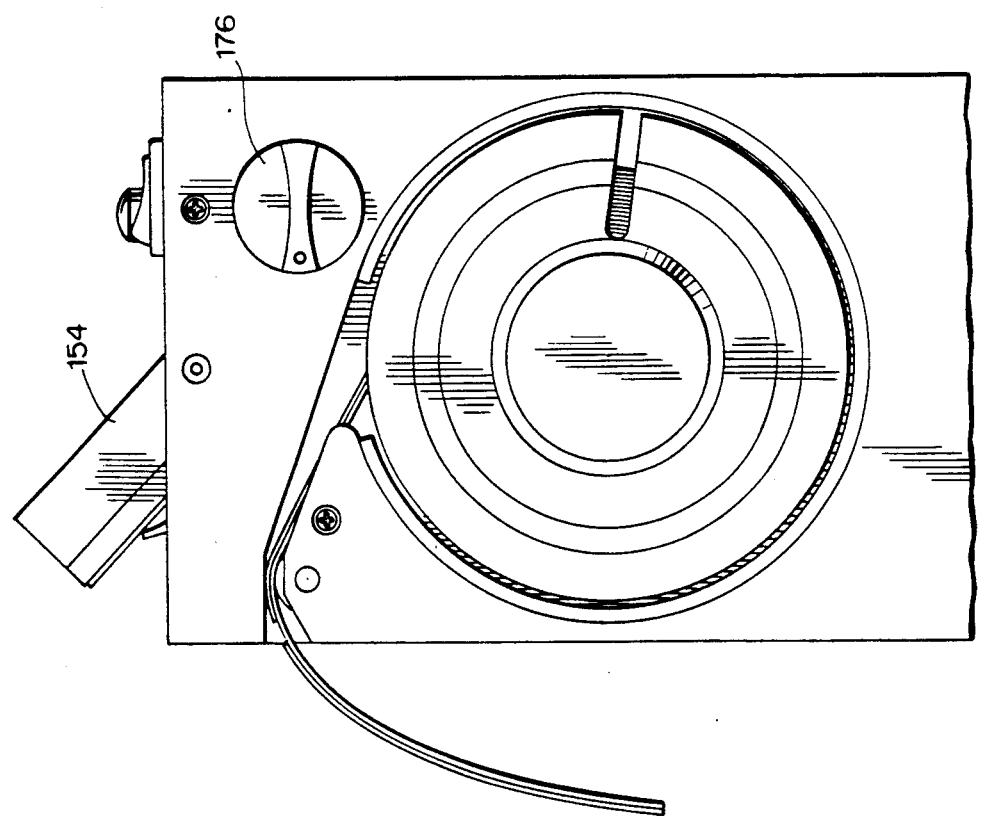
FIG. 2 is a side elevation view of the portable barcode printer.

With reference to the drawings, in general, and to FIGS. 1 through 3, in particular, a portable barcode printer embodying the teachings of the subject invention is generally designated as 10.

In FIG. 1, the portable barcode printer 10 is shown which includes housing unit 90 having main housing section 90 to which is secured a rear cover 104. A horizontally extending spindle 116 is located within a paper storage container 118. Housed within the spindle 116 is drive motor 198 for driving roller 184.

A spool of thermal paper 80 is wrapped around the spindle 116 and is threaded through slot 114 to extend between roller 184 and printhead 154. The spool of paper 80 includes a plurality of barcode labels 70 which are spaced about the spool in a desired pattern. In FIG. 1, the printhead dial 176 is shown in the "close" position for positioning paper between the drive roller 184 and the printhead assembly 154.

In FIG. 2, the printhead 154 is shown in the open position as controlled by the printhead dial 176. When the printhead dial is rotated from the position shown in FIG. 2, in a clockwise direction, the printhead 154 is moved to the closed and then to the printing position as is shown in solid lines in FIG. 3.

In the sectional view of FIG. 3, the printhead dial has been rotated to a position shifted approximately 200 degrees from the position shown in FIG. 2. In this position, the spring anchor 172 is shifted so as to stretch spring 168 so as to pull the printhead into further compression against the drive roller 184 with thermal label 70 compressed between the printhead 154 and the drive roller 184. Upon return to the position shown in FIG. 2 in solid lines and shown in dotted lines in FIG. 3, the spring 168 is in its relaxed condition and acts as a push rod to push on flange 164 so as to pivot the printing head about pin 158. During the rotation of the printhead dial 176, the spring anchor 172 moves within arcuate groove 173 having an arc of approximately 200 degrees.

Figure 4:
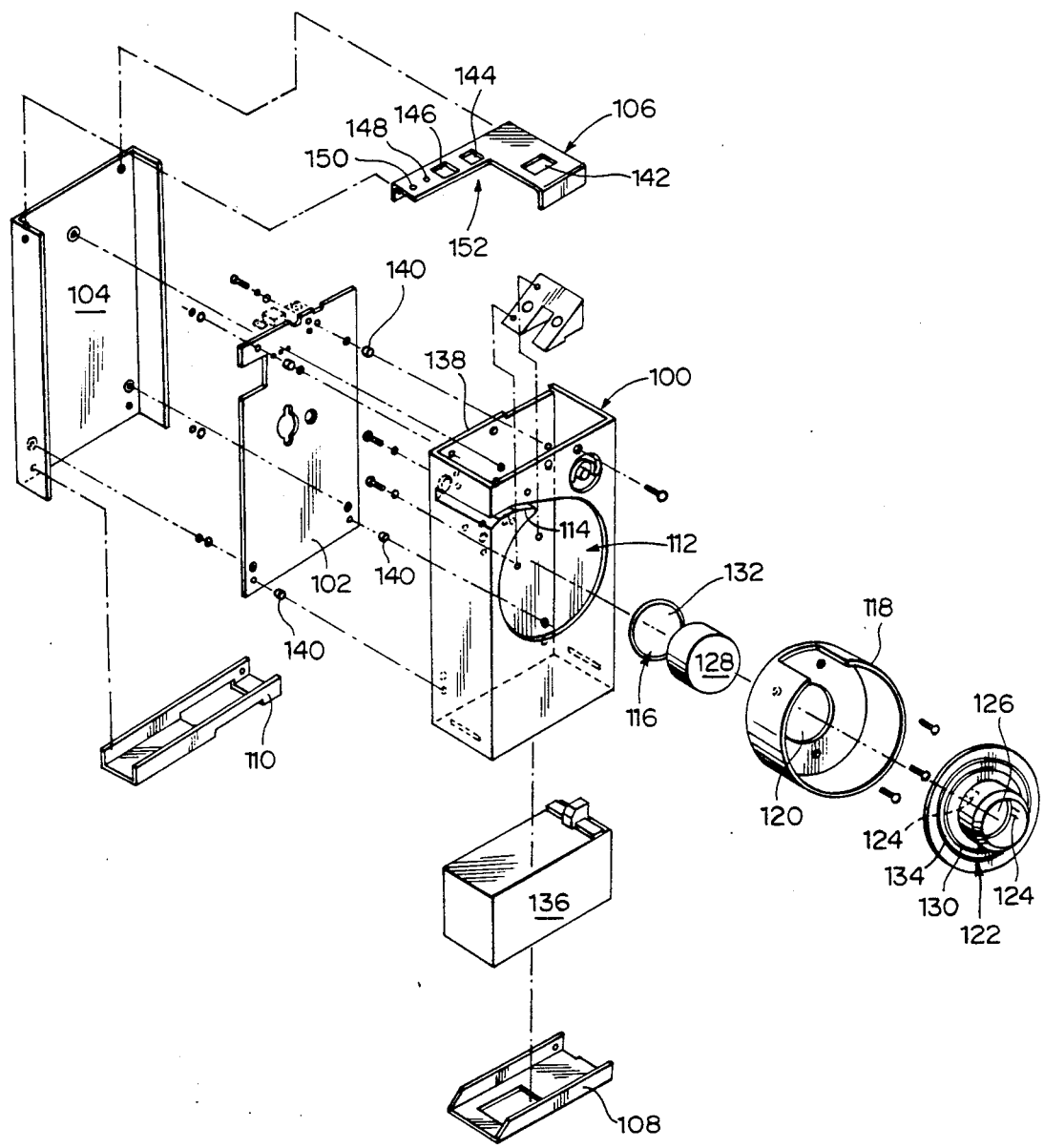
FIG. 4 is an exploded perspective view of a portable barcode printer.

In FIG. 4, an exploded view of the portable barcode printer is shown. In this view, the separated housing sections of housing unit 90 are shown to include closed rectangular aluminum stock main housing section 100. Separated from the main housing section 100 is support plate 102. Shown separated from the support plate 102 is rear cover 104 having three sides. The top of the housing is closed by top cover 106 and the bottom is enclosed by battery door 108 and bottom cover 110. The bottom includes a port for entry of a connection from a generator of bar code pattern signals.

Figure 5:
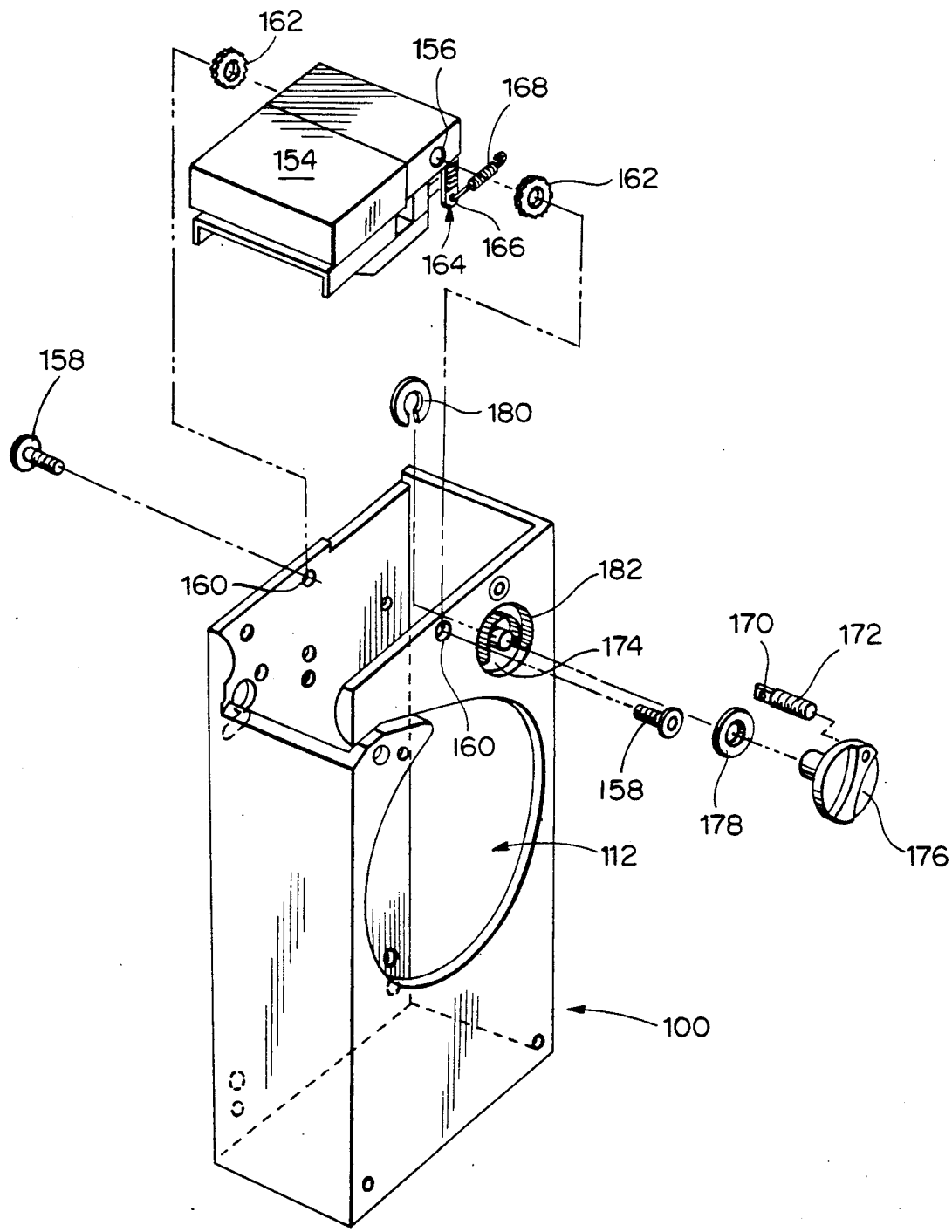
FIG. 5 is an exploded perspective view of one portion of the printer which includes the printhead assembly.
Figure 7:
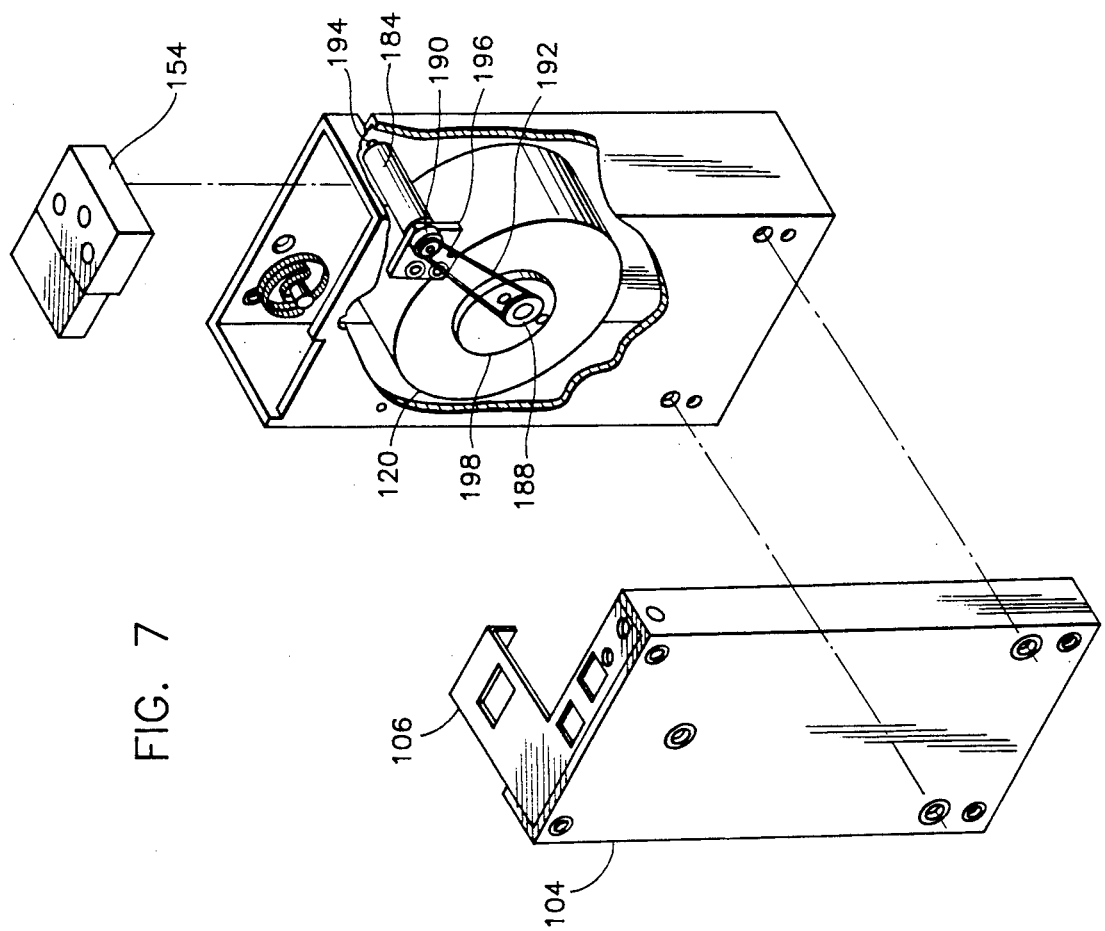
FIG. 7 is an exploded perspective view showing two portions of the housing.
Figure 9:
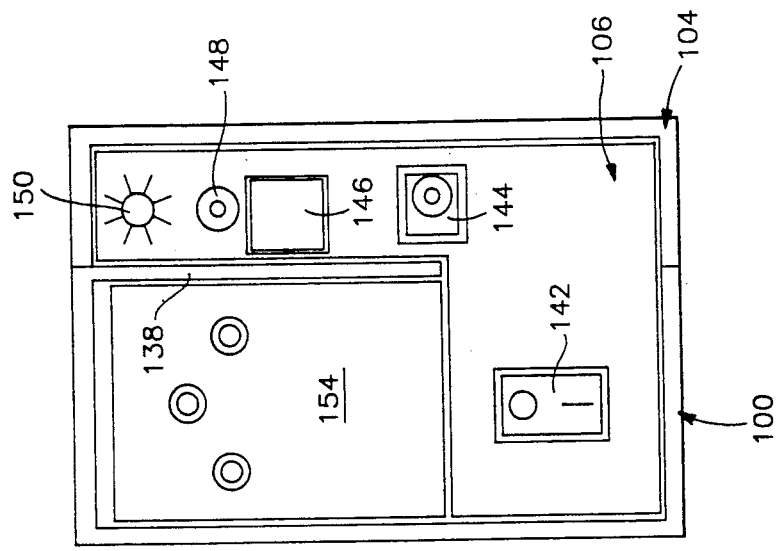
FIG. 9 is a top plan view of the housing of the portable barcode printer.

In main housing section 100 is an opening 112 for receipt of a thermal paper roll 80 which is fed along slot 114 for passage adjacent a printhead assembly 154 (shown in FIGS. 5, 7 and 9). Within the opening 112 is located paper spindle 116 which houses a motor 198 for driving the paper. The spindle 116 is centrally located within a paper storage container 118 and extends through opening 120 of the cavity. A paper cover 122 includes locking clips 124 so that when the paper cover 122 is fitted over the spindle 116 through the opening 126, the locking clips 124 fit within corresponding openings of the upper portion 128 of the spindle 116. The terminal end of the upper portion 12B will then lie flush with the outermost portion of the paper cover 122. The circular flat portion 130 of the paper cover 122 thereby retains a roll of paper around the bottom portion 132 of the spindle 116, while viewing the amount of paper retained about spindle 116 through viewing slot 134.

Also located within the main housing section 100 is battery pack 136 which is retained in place by cover 108. The main housing section 100 is of a rectangular configuration and three of its four sides are exposed in the final form of the barcode printer to simultaneously act as an internal housing for containing the components of the barcode printer to which they are mounted and forming a portion of the exterior of the housing without further modification.

To the fourth, internally hidden wall 138 of the main housing section 100 is secured support plate 102 which provides support for a drive assembly as will be described with reference to FIG. 6. Spacers 140 slightly offset support wall 102 from the hidden wall 138 of the main housing section 100.

Extending rearwardly from the hidden wall 138 is rear cover 104 having three sides so as to surround support plate 102 and to be fixed to the wall 138 of the main housing section 100. The rear cover 104 surrounds the drive assembly and facilitates servicing, if necessary, by the removal of the rear cover 104.

Spanning the main housing section 100 and the rear cover 104 across the open top of the housing unit is top cover 106. The cover includes a power switch 142, an external power connection 144, a paper feed switch 146, a battery charger connection 148 and a low-battery LED indicator 150. An opening 152 of the top cover 106 is for the printhead assembly 154 as will be explained with reference to the other figures.

In FIG. 5, main housing section 100 is shown in an exploded view with the printhead 154 being shown having lateral openings 156 on opposite sides through which pivot pins 158 are received after passing through openings 160 located in opposite sides of the main housing section 100. A washer 162 is located on the pivot pin 162 between the internal side walls of the housing section 100 and the printhead 154

A vertically extending flange 164 includes an opening at its terminal end 166 through which is threaded one end of a spring 168. The opposite end of the spring 168 is connected to an opening 170 of spring anchor 172, which extends laterally into the interior of the main housing section 100 from the printhead dial 176.

Printhead dial 176 is rotatably mounted in opening 174 after passing through bearing 178 and being engaged by retainer ring 180 on the interior of the main housing section 100. Arcuate groove 182 help guide the spring anchor 172 of the printhead dial in position.

Figure 8A:
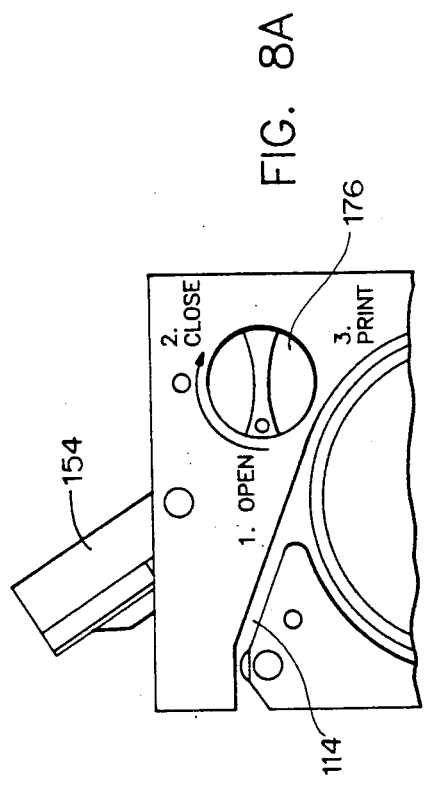
FIGS. 8A through 8C illustrate different positioning of a printhead dial between an open, a closed and a print position.
Figure 8B:
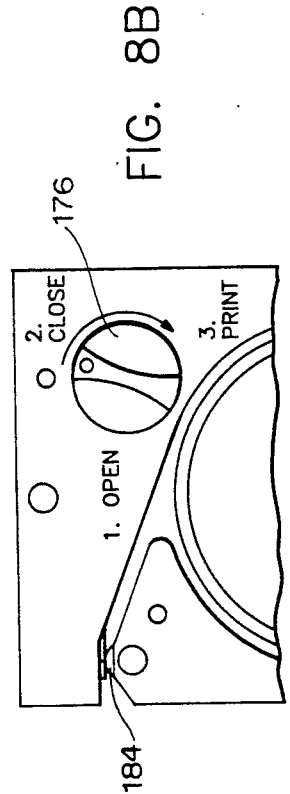
Figure 8C:
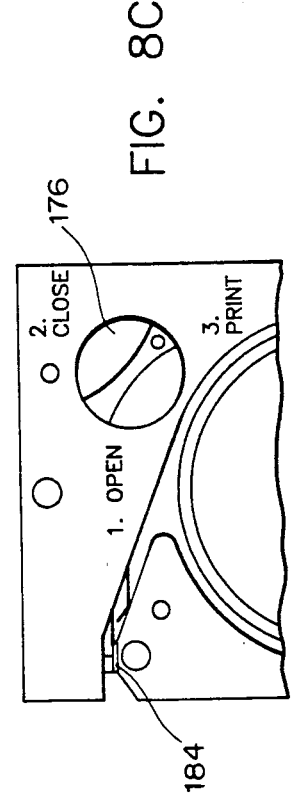

As shown in FIGS. 8A through 8C, in the position labeled "1. OPEN", by rotation of the printhead dial, the spring 168 acts as a push rod to move the printhead to project above the plane of the uppermost surface of the housing so as to provide a clear path in slot 114 for receipt of or removal of paper.

Upon rotation of the printhead dial 176 in a clockwise direction to the position labeled "2. CLOSED" as shown in FIG. 8B, the printhead 154 is moved into the path of slot 114 to hold paper between the printhead and the drive roller 184. The spring 168 is still in this position in its compressed condition and acts as an actuating rod to merely move the printhead to the closed position.

Upon continued rotation of the printhead dial 176 in a clockwise direction as shown in FIG. 8C, the spring 168 is stretched and the printhead 154 is further moved against the drive roller 184 to compress the paper located within the slot 114. In this position, the printhead is ready for the operation of contacting heated portions of the printhead with thermal paper.

Figure 6:
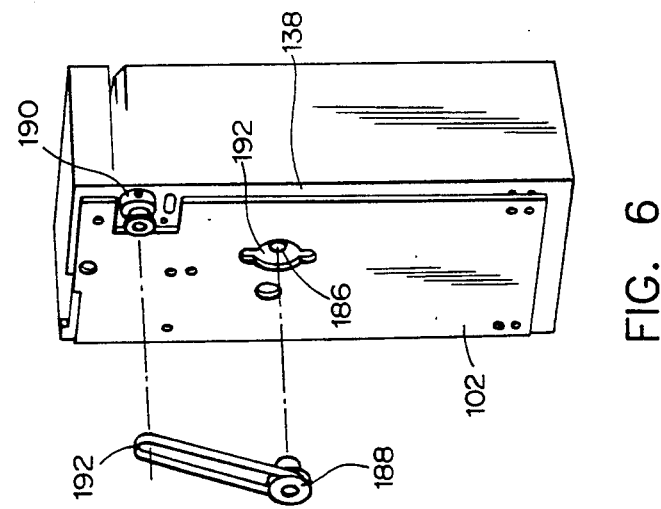
FIG. 6 is an exploded perspective view showing the drive mechanism.

In FIG. 6, support plate 102 is shown mounted onto the wall 138 of main housing section 100. A motor shaft 186 is shown which extends from the motor which is located within the paper spindle 116. To be secured to the motor shaft 186 is drive gear 188. Mounted onto an end of drive roller 184 (shown in FIG. 7) is small drive gear 190. Entrained about the small drive gear 190 and the drive gear 188 is belt 192 which transfers the drive from the motor to the drive roller 184. The drive gear 188 extends through an opening 192 and a corresponding opening in the wall 138 of the main housing section 100.

In FIG. 7, the drive assembly is shown with the shaft 194 of the drive roller 184 extending through the small drive gear 190, which is mounted on a bearing cover 196. In FIG. 7, the motor 198 is shown projecting from the paper cavity 120. In FIG. 7, the support plate 102 has been omitted for purposes of clarity.

By the present invention, extruded aluminum stock may be used to form the interior housing upon which the components are mounted as well as serving the additional purpose of forming the exterior housing. In addition, a drive motor is centrally located within the housing within a spindle about which a paper roll is wound to save space and minimize the distance over which a drive force must be transferred to a drive roller. In addition, a printhead is pivotably mounted in a main housing section for movement between an open position for removal or feeding of thermal paper, a closed position to check the alignment of the paper, and a print position for biased contact of the printhead with the paper for assurance of quality printing of barcodes.

Having described the invention, many modifications thereto, will become apparent to those skilled in the art to which it pertains without deviation from the spirit of the invention as defined by the scope of the appended claims.

We claim:

1. A barcode printer comprising:
a main frame made of extruded material,
a housing unit mounted within said main frame,
a printhead pivotally mounted on said main frame for printing barcode
a storage container for paper, said storage container being mounted in said housing, and
a spindle located in said storage container including a drive motor for advancing paper from said storage container.

2. A barcode printer as claimed in claim 1, wherein said main frame includes a feed slot extending from said storage container to said printhead for feeding of paper to said printhead.

3. A barcode printer as claimed in claim 1, wherein a drive roller is mounted on said main frame and adjacent to said printhead for advancing paper from said storage container.

4. A barcode printer as claimed in claim 3, wherein a printhead dial is rotatably mounted on said main frame for moving said printhead.

5. A barcode printer as claimed in claim 4, wherein said printhead is moved by said printhead dial between an open, a closed and a print position.

6. A barcode printer as claimed in claim 5, wherein said printhead is biased against said drive roller when in the print position.

7. A barcode printer as claimed in claim 1, wherein paper is wrapped around said spindle and fed to said printhead.

8. A portable barcode printer comprising:
a housing unit,
a printhead pivotally mounted in said housing unit for printing barcode labels,
a storage container for paper located within said housing unit,
a spindle of said storage container for receiving a spool of paper,
a drive roller for advancing paper to said printhead,
a drive motor located within said spindle for driving said drive roller, and
means for said drive motor to rotate said drive roller.

9. A portable barcode printer as claimed in claim 8, wherein said housing unit includes a feed slot for feeding paper from said storage container to said drive roller.

10. A portable barcode printer as claimed in claim 8, wherein a printhead dial is rotatably mounted on said housing unit.

11. A portable barcode printer as claimed in claim 10, wherein said printhead is moved by said printhead dial between an open, a closed and a print position.

12. A portable barcode printer as claimed in claim 11, wherein said printhead is biased against said drive roller when in the print position.

13. A barcode printer comprising:
a housing unit,
a printhead pivotally mounted in said housing unit for printing barcode labels,
a storage container for paper located within said housing unit,
a roller located adjacent to said printhead for advancement of paper from said storage container, and
means for moving said printhead towards and away from said roller,
said storage container including a spindle having a motor therein for driving said roller.

14. A barcode printer as claimed in claim 13, wherein said means includes a printhead dial for moving said printhead between an open position where said printhead is located spaced from said roller, a closed position where said printhead is located adjacent to said roller and a print position where said printhead is biased against said roller.

15. A barcode printer as claimed in claim 13, wherein said housing unit includes a slot extending between said storage container and said roller for feeding of paper to said printhead.

16. A barcode printer comprising:
a housing unit,
a printhead pivotally mounted in said housing unit for printing barcode labels,
a storage container for paper located within said housing unit,
a roller located adjacent to said printhead for advancement of paper from said storage container, and
means for moving said printhead towards and away from said roller, said means including
a printhead dial for moving said printhead between an open position where said printhead is located spaced from said roller, a closed position where said printhead is located adjacent to said roller and a print position where said printhead is biased against said roller, and
spring means interconnecting said printhead dial and said printhead for biasing said printhead against said roller by a stretching of said spring means during movement of said printhead from said closed position to said print position and for moving said printhead as a pushrod in a compressed state during movement of said printhead from said closed position to said open position.

17. A barcode printer as claimed in claim 16, wherein said storage container includes a spindle having a motor therein for driving said roller.

* * * * *